United States Patent
Moriya et al.

(10) Patent No.: US 7,210,456 B2
(45) Date of Patent: May 1, 2007

(54) CONTROL DEVICE FOR INTERNAL COMBUSTION ENGINE AND METHOD FOR DETERMINING MISFIRE IN INTERNAL COMBUSTION ENGINE

(75) Inventors: Hidenori Moriya, Susono (JP); Kouhei Miwa, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/566,604

(22) PCT Filed: Jul. 8, 2004

(86) PCT No.: PCT/JP2004/010077

§ 371 (c)(1),
(2), (4) Date: Mar. 24, 2006

(87) PCT Pub. No.: WO2005/014993

PCT Pub. Date: Feb. 17, 2005

(65) Prior Publication Data

US 2006/0217872 A1  Sep. 28, 2006

(30) Foreign Application Priority Data

Aug. 6, 2003 (JP) ............................. 2003-288165

(51) Int. Cl.
*F02M 7/00* (2006.01)
(52) U.S. Cl. ...................... 123/435; 73/118.1
(58) Field of Classification Search ........ 123/435–436; 73/118.1, 118.2
See application file for complete search history.

(56) References Cited

U.S. PATENT DOCUMENTS

| 6,598,468 B2 * | 7/2003 | Zur Loye et al. ........... 73/117.3 |
| 7,113,861 B2 * | 9/2006 | Jacobson .................... 701/101 |
| 2006/0129307 A1 * | 6/2006 | Yasui ........................ 701/114 |

FOREIGN PATENT DOCUMENTS

| EP | 1653071 | * | 5/2006 |
| JP | A-63-268951 | | 11/1988 |
| JP | A-03-246373 | | 11/1991 |
| JP | A-04-081534 | | 3/1992 |
| JP | A-04-081557 | | 3/1992 |
| JP | A-11-082150 | | 3/1999 |
| JP | A-200-097979 | | 4/2000 |
| JP | A-2000-234558 | | 8/2000 |
| JP | A-2002-097996 | | 4/2002 |
| JP | A-2002-256950 | | 9/2002 |
| JP | 2005-207407 | * | 8/2005 |
| JP | 2006-70885 | * | 3/2006 |
| WO | WO 02/079629 A1 | | 10/2002 |

* cited by examiner

Primary Examiner—Hai Huynh
(74) Attorney, Agent, or Firm—Oliff & Berridge, PLC

(57) ABSTRACT

An internal combustion engine (1) generates power by burning an air-fuel mixture in a combustion chamber (3). The internal combustion engine (1) is provided with an in-cylinder pressure sensor (15) and an ECU (20). The ECU 20 calculates at two predetermined points control parameters each of which is a product of an in-cylinder pressure detected by the in-cylinder pressure sensor (15) and a value obtained by exponentiating an in-cylinder volume at the time of detecting the in-cylinder pressure by a predetermined index number, as well as determines a misfire condition in the combustion chamber (3) based on the difference component in the control parameters between the two predetermined points.

10 Claims, 3 Drawing Sheets

CONTROL DEVICE FOR INTERNAL COMBUSTION ENGINE AND METHOD FOR DETERMINING MISFIRE IN INTERNAL COMBUSTION ENGINE

TECHNICAL FIELD

The present invention relates to a control device for an internal combustion engine that generates power by burning an air-fuel mixture in a cylinder, and a method for determining a misfire in the internal combustion engine.

BACKGROUND ART

Conventionally, Patent Literature 1 has disclosed a firing condition-detecting device for an internal-combustion engine that overlaps in-cylinder pressure signals in respective combustion chambers detected by in-cylinder pressure detecting means to determine a misfire condition with a misfire determining index number calculated based on the overlapped in-cylinder pressure signals.

As stated above, when each of the in-cylinder pressures in a plurality of the combustion chambers is overlapped, a significant change is recognized in symmetry property of a signal waveform before and after a top dead center, in accordance with presence or absence of a misfire. Therefore, the misfire determination can be made in the whole region of combustion in the internal combustion engine.

In the conventional, firing condition-detecting device, however, the misfire determining index number is basically calculated by integrating an in-cylinder pressure detected by the in-cylinder pressure detecting means, per unit of a minute crank angle. Consequently, a load on calculation in the conventional firing condition-detecting device is substantial, so that it is not actually easy to apply the conventional device to an internal combustion engine for a vehicle and the like, for example.

[Patent Literature 1] Japanese Patent Application Laid-open No. 11-82150

DISCLOSURE OF THE INVENTION

The present invention provides a practical control device for an internal combustion engine and a method for determining a misfire in the internal combustion engine, which are capable of accurately determining a misfire condition in a cylinder at a low load.

According to a control device for an internal combustion engine in the present invention, the control device for the internal-combustion engine that generates power by burning an air-fuel mixture in a cylinder comprises in-cylinder pressure detecting means, calculating means that calculates a control parameter based on an in-cylinder pressure detected by the in-cylinder pressure detecting means and an in-cylinder volume at the time of detecting the in-cylinder pressure, and misfire determining means that determines a misfire condition in the cylinder based upon the control parameter calculated by the calculating means.

It is preferable that the control parameter is a product of the in-cylinder pressure detected by the in-cylinder pressure detecting means and a value obtained by exponentiating the in-cylinder volume at the time of detecting the in-cylinder pressure by a predetermined index number.

It is preferable that the calculating means calculates the control parameters in two predetermined points, and the misfire determining means determines that an inside of the cylinder is in a half-misfire condition when a difference component in the control parameters between the two predetermined points is below a first threshold value.

It is preferable that the misfire determining means determines that an inside of the cylinder is in a complete-misfire condition when the difference component in the control parameters between the two predetermined points is below the first threshold value and also below a second threshold value, which is smaller than the first threshold value.

It is preferable that one of the two predetermined points is set at a point after an intake valve opens and also before combustion starts, and the other is set at a point after the combustion starts and also before an exhaust valve opens.

According to a method for determining a misfire in an internal combustion engine in the present invention, the method for determining the misfire in the internal combustion engine that generates power by burning an air-fuel mixture in a cylinder comprises:

(a) a step of detecting an in-cylinder pressure;
(b) a step of calculating a control parameter based on the in-cylinder pressure detected in the step (a) and an in-cylinder volume at the time of detecting the in-cylinder pressure; and
(c) a step of determining a misfire condition in the cylinder based on the control parameter calculated in the step (b).

It is preferable that the control parameter is a product of the in-cylinder pressure detected in the step (a) and a value obtained by exponentiating the in-cylinder volume at the time of detecting the in-cylinder pressure by a predetermined index number.

It is preferable that in the step (b), the control parameters are calculated in two predetermined points, and in the step (c), it is determined that an inside of the cylinder is in a half-misfire condition when a difference component in the control parameters between the two predetermined points is below a first threshold value.

It is preferable that in the step (c), it is determined that the inside of the cylinder is in a complete-misfire condition when the difference component in the control parameters between the two predetermined points is below the first threshold value and also below a second threshold value, which is smaller than the first threshold value.

It is preferable that one of the two predetermined points is set at a point after an intake valve opens and also before combustion starts, and the other is set at a point after the combustion starts and also before an exhaust valve opens.

BEST MODE FOR CARRYING OUT THE INVENTION

Figure 1:
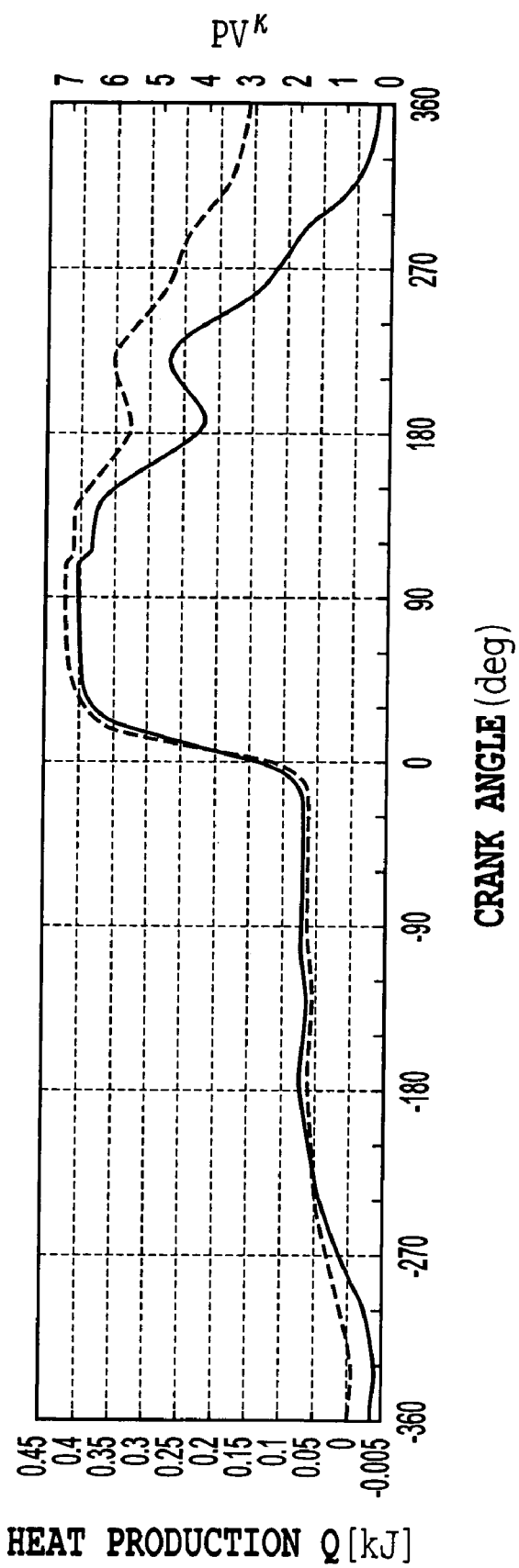
FIG. 1 is a graph showing correlation between a control parameter $PV^\kappa$ used in the present invention and heat production in a combustion chamber.

The present inventors are dedicated to studying in order to enable highly accurate control for an internal combustion engine with a load on calculation being reduced. As a result, the present inventors have come to focus attention on a control parameter calculated based on an in-cylinder pressure detected by in-cylinder pressure detecting means and an in-cylinder volume at the time of detecting the in-cylinder pressure. In more detail, the present inventors, in a case where an in-cylinder pressure detected by in-cylinder pressure detecting means when a crank angle is θ degrees is defined as P(θ), an in-cylinder volume V(θ) when a crank angle is θ degrees, and a specific heat ratio is defined as κ, have focused on a control parameter obtained as a product of the in-cylinder pressure P(θ) and a value V$^κ$(θ) obtained by exponentiating the in-cylinder volume V(θ) with the specific heat ratio (predetermined index number) κ (hereinafter referred to as "PV$^κ$" as needed). Moreover, the present inventors have found out that there is correlation between a change pattern for heat production Q in the cylinder in the internal combustion engine relative to the crank angle and a change pattern for the control parameter PV$^κ$ relative to the crank angle, as shown in FIG. 1. However, −360°, 0° and 360° correspond to a top dead center, and −180° and 180° correspond to a bottom dead center in FIG. 1.

In FIG. 1, in a certain model cylinder a solid line shows a plot of a control parameter PV$^κ$ that is a product of an in-cylinder pressure detected for each predetermined minute crank angle and a value obtained by exponentiating an in-cylinder volume at the time of detecting the in-cylinder pressure by a specific heat ratio κ. Besides, in FIG. 1, a dashed line shows a plot of heat production Q in the model cylinder calculated as "Q=∫d Q" based on the following formula (1). In addition, "κ=1.32" is defined in any case for easiness.

[Formula 1]

$$\frac{dQ}{d\theta} = \left\{\frac{dP}{d\theta} \cdot V + \kappa \cdot P \cdot \frac{dV}{d\theta}\right\} \cdot \frac{1}{\kappa - 1} \quad (1)$$

As shown in a result in FIG. 1, the change pattern for the heat production Q relative to the crank angle and the change pattern for the control parameter PV$^κ$ relative to the crank angle are nearly similar (identical). Especially, the change pattern for the heat production Q and the change pattern for the control parameter PV$^κ$ are extremely similar before or after combustion of an air-fuel mixture in a cylinder starts (at the time of spark ignition in a gasoline engine, and at the time of compression ignition in a diesel engine) (for instance, the range between approximately −180° and approximately 135° in FIG. 1).

On the other hand, when a misfire occurs in a certain cylinder, heat production ∫d Q (a value in which d Q is integrated from θ$_1$ to θ$_2$, for instance, [however, θ$_1$<θ$_2$], hereinafter referred to as the same) from a certain timing before the combustion starts (the spark ignition or the compression ignition) to a certain timing after the combustion starts, is made smaller in the certain cylinder, as compared to a cylinder in which a misfire does not occur. In addition, the heat production ∫dQ also changes in accordance with the level of the misfire in a cylinder. Therefore, when such relationship between the heat production Q and the misfire condition in the cylinder, and correlation between the heat production Q in the cylinder and the control parameter PV$^κ$ found out by the present inventors are utilized, it is possible to accurately determine the misfire condition in the cylinder at a low load, based on the control parameter PV$^κ$ calculated based on the in-cylinder pressure detected by the in-cylinder pressure detecting means and the in-cylinder volume at the time of detecting the in-cylinder pressure.

In this way, in a control device for an internal combustion engine in the present invention, based upon the above-mentioned novel findings, a misfire condition in a cylinder is determined based on a control parameter calculated based upon an in-cylinder pressure detected by in-cylinder pressure detecting means for detecting the in-cylinder pressure and an in-cylinder volume at the time of detecting the in-cylinder pressure, i.e. a control parameter (PV$^κ$) that is a product of an in-cylinder pressure detected by the in-cylinder pressure detecting means and a value obtained by exponentiating an in-cylinder volume at the time of detecting the in-cylinder pressure by a predetermined index number.

Moreover, it is preferable to determine that an inside of the cylinder is in a half-misfire condition in the case where the control parameter is calculated in two predetermined points, and a difference component in the control parameters between the two predetermined points is below a first threshold value. Further, it is preferable to determine that the inside of the cylinder is in a complete-misfire condition in the case where a difference component in the control parameters between the two predetermined points is below a first threshold value and below a second threshold value, which is smaller than the first threshold value.

As stated above, the control parameter PV$^κ$ that the present inventors have focused attention on reflects heat production Q in a cylinder in the internal combustion engine. Moreover, the difference component in the control parameters PV$^κ$ between two predetermined points (for instance, two points before or after combustion starts in the cylinder) indicates heat production ∫d Q in the cylinder between the two points, and also can be calculated at an extremely low load. Furthermore, the heat production ∫d Q in the cylinder between the two points changes in accordance with the level of a misfire in the cylinder. For instance, the heat production ∫d Q is to be within a predetermined range in the case where the inside of the cylinder is in a half-misfire condition. Therefore, when the difference component in the control parameters PV$^κ$ between two predetermined points, and the first threshold value and the second threshold value are compared, a misfire condition in the cylinder can be accurately determined with a load on calculation being substantially reduced. In this case, it is preferable that one of the two predetermined points is set at a point after an intake valve opens and also before combustion starts, and the other is set at a point after the combustion starts and also before an exhaust valve opens.

Hereinafter, the best mode for carrying out the present invention will be specifically described with reference to the drawings.

Figure 2:
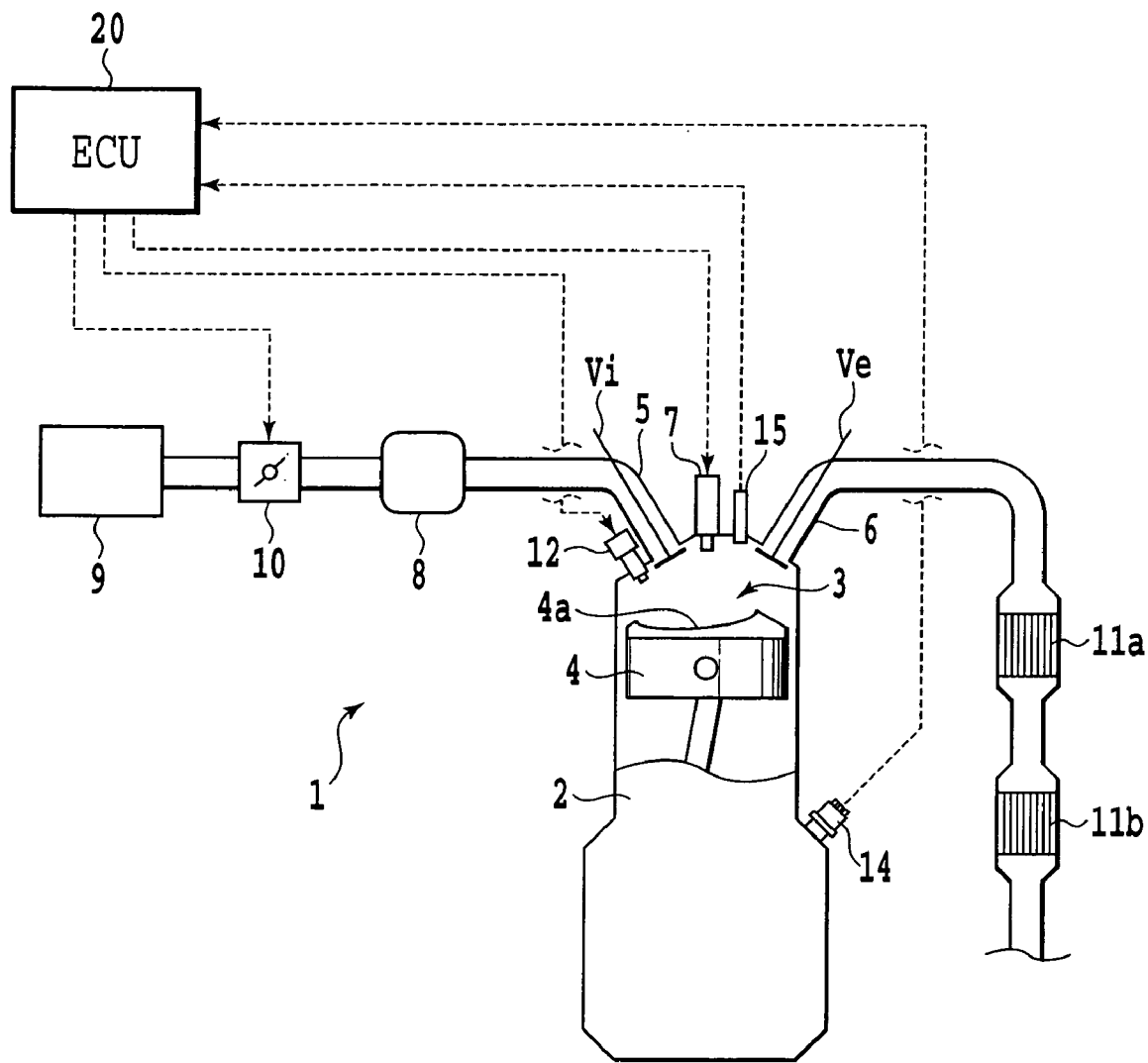
FIG. 2 is a schematic construction view showing an internal combustion engine in the present invention.

FIG. 2 is a schematic construction view showing an internal combustion engine in the present invention. An internal combustion engine 1 as shown in FIG. 2 generates power by burning an air-fuel mixture in a combustion chamber 3 formed in a cylinder block 2 and reciprocating a piston 4 in the combustion chamber 3. The internal combustion engine 1 is preferably formed as a multi-cylinder engine. The internal combustion engine 1 in the embodiment is formed as a four-cylinder engine, for instance.

An intake port in each combustion chamber 3 is respectively connected to an intake pipe 5 (an intake manifold), and an exhaust port in each combustion chamber 3 is respectively connected to an exhaust pipe 6 (an exhaust manifold). In addition, an intake valve Vi and an exhaust valve Ve are arranged in a cylinder head in the internal combustion engine 1 for each combustion chamber 3. Each of the intake valves Vi opens and closes a corresponding intake port, and each of the exhaust valves Ve opens and closes a corresponding exhaust port. Each of the intake valves Vi and each of the exhaust valves Ve, for instance, are operated by a valve operated mechanism (not shown) including a variable valve timing function. Further, the internal combustion engine 1 includes spark plugs 7 in number corresponding to the number of cylinders, and the spark plugs 7 are arranged in the cylinder head in such a way as to be exposed to the corresponding combustion chambers 3.

The intake pipe 5 is connected to a surge tank 8 as shown in the FIG. 2. A charge line L1 is connected to the surge tank 8, and the charge line L1 is connected to an air inlet (not shown) through an air cleaner 9. Besides, a throttle valve 10 (an electronically controlled throttle valve in the embodiment) is installed in a mid-course of the charge line L1 (between the surge tank 8 and the air cleaner 9). On the other hand, a pre-catalytic device 11*a* including a three-way catalyst and a post-catalytic device 11*b* including a NOx occluded reduction-catalyst are connected to the exhaust pipe 6 as shown in FIG. 2.

Moreover, the internal combustion engine 1 includes a plurality of injectors 12, and each of the injectors 12 is arranged in the cylinder head in such a way as to be exposed to the inside of each corresponding combustion chamber 3 as shown in FIG. 2. In addition, each of the pistons 4 in the internal combustion engine 1 is formed in a so-called bowl-top-face type, and includes a concave portion 4*a* thereon. Further, fuel such as gasoline is directly injected from each of the injectors 12 toward the concave portion 4*a* of the piston 4 in each combustion chamber 3 in a state where air is still aspired in each combustion chamber 3 in the internal combustion engine 1. Herewith, since a layer of an air-fuel mixture is formed (stratified) adjacent to the spark plug 7 in a state of being separated from the surrounding air layer in the internal combustion engine 1, a stable stratified combustion can be performed under an extremely lean mixture In addition, it should be noted that although the internal combustion engine 1 in the embodiment is described as a so-called direct injection engine, it is obvious that the present invention is not limited to the direct injection engine but also may be applied to an internal combustion engine of an intake pipe (an intake port) injection type.

Each of the spark plugs 7, the throttle valve 10, each of the injectors 12, the valve operated mechanism and the like as described above are electrically connected to an ECU 20 that functions as the control device for the internal combustion engine 1. The ECU 20 includes a CPU, a ROM, a RAM, an input/output port, a storage unit and the like (not shown). Various types of sensors such as a crank angle sensor 14 for the internal combustion engine 1 are electrically connected to the ECU 20 as shown in FIG. 2. The ECU 20 controls the spark plug 7, the throttle valve 10, the injector 12, the valve operated mechanism and the like based on use of various types of maps stored in the storage unit, as well as detected values of the various types of the sensors or the like for a desired power output.

Further, the internal combustion engine 1 includes in-cylinder pressure sensors 15 (in-cylinder pressure detecting means), each having a semiconductor device, a piezoelectric element or an optical fiber-detecting component and the like, in number corresponding to the number of cylinders. Each of the in-cylinder pressure sensors 15 is arranged in the cylinder head such that a pressure receiving face thereof is exposed to the inside of the corresponding combustion chamber 3, and electrically connected to the ECU 20. Each in-cylinder pressure sensor 15 detects an in-cylinder pressure in the corresponding combustion chamber 3, and sends a signal indicating the detected value to the ECU 20.

Next, a procedure in the processing for determining a misfire in the internal combustion engine 1 will be explained with reference to FIG. 3.

Figure 3:
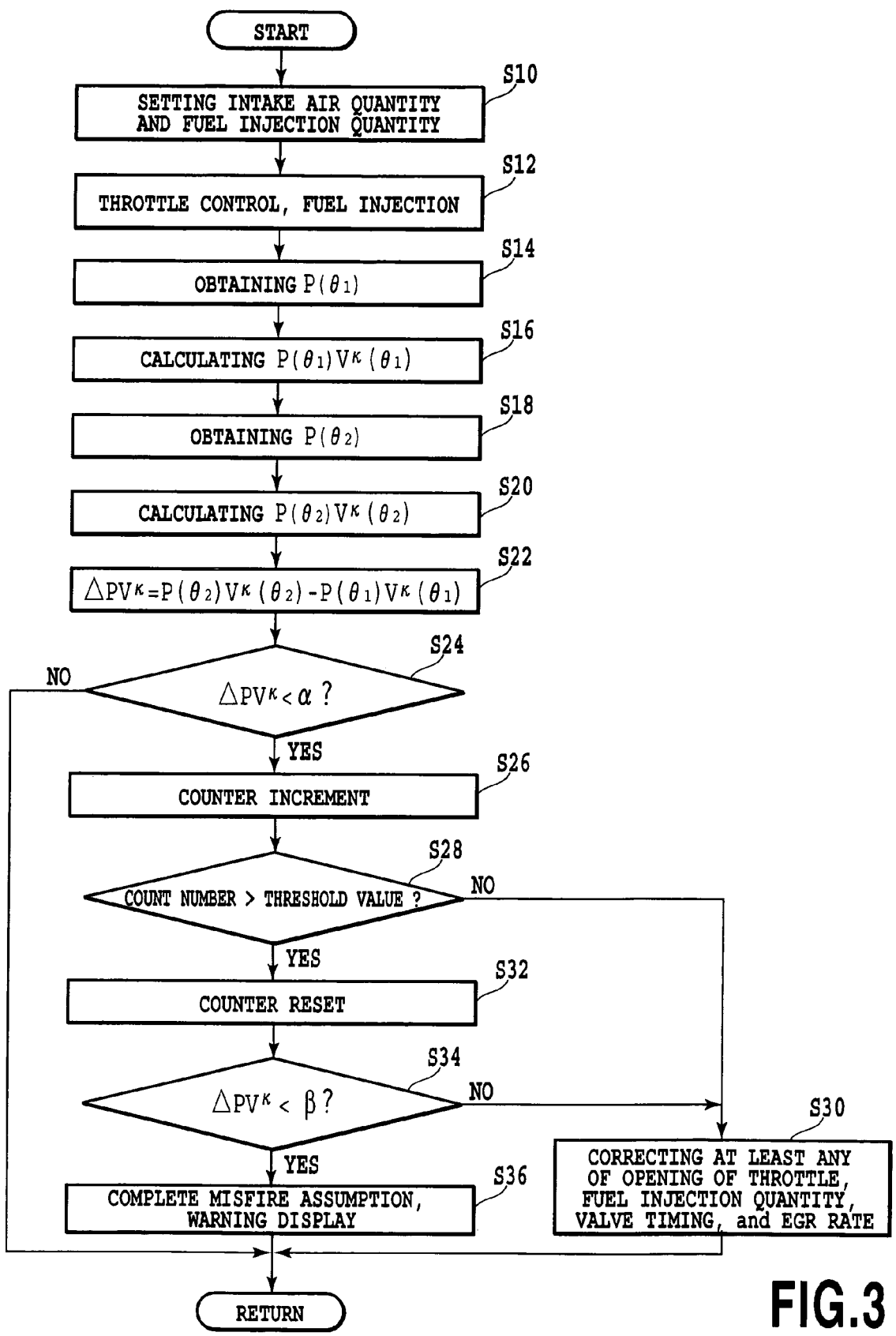
FIG. 3 is a flow chart for explaining an operation in the internal combustion engine in the FIG. 2.

After the internal combustion engine 1 starts up, when the engine 1 is shifted from an idling condition to an idling-off condition, the ECU 20, as shown in FIG. 3, defines a target torque for the internal combustion engine 1 based on a signal or the like from an accelerator positioning sensor (not shown), as well as sets an intake air quantity (opening of the throttle valve 10) corresponding to the target torque by using a map prepared in advance or the like and a fuel injection quantity (fuel injection time) from each of the injectors 12 (step S10) Moreover, in a step S12, the ECU 20 sets the opening of the throttle valve 10 so as to be the opening obtained in the step S10 and also forces each injector 12 to inject fuel, for example, in a fuel quantity defined during an intake stroke in the step S10.

Further, the ECU 20 monitors a crank angle for the internal combustion engine 1 based on a signal from the crank angle sensor 14. In addition, the ECU 20 obtains an in-cylinder pressure $P(\theta_1)$ for each combustion chamber 3 at a point when a crank angle becomes $\theta_1$ degrees, based on a signal from the in-cylinder pressure sensor 15, after each of the intake valves Vi opens and also when a first timing (a timing when the crank angle becomes $\theta_1$ degrees) set before ignition by each of the spark plugs 7 comes (step S14). Furthermore, the ECU 20 calculates a control parameter $P(\theta_1) \cdot V^\kappa(\theta_1)$ for each combustion chamber 3, which is a product of the obtained in-cylinder pressure $P(\theta_1)$ and a value obtained by exponentiating an in-cylinder volume $V(\theta_1)$ at a point when the in-cylinder pressure $P(\theta_1)$ is detected, in other words, when the crank angle becomes $\theta_1$ degrees by a specific heat ratio $\kappa$ ($\kappa$=1.32 in the embodiment), and stores the parameter in a predetermined storage area in the RAM (step S16).

It is preferable that the first timing is set as a point after a sufficient period of time prior to a point when combustion starts in each of the combustion chambers 3 (ignition time). The first timing is, for instance, defined as a timing ($\theta_1$=−60°, in other words, 60° before a top dead center) when the crank angle indicated in the signal from the crank angle sensor 14 becomes −60°, in the embodiment. In addition, a value of $V^\kappa(\theta_1)$ (a value of $V^\kappa(-60°)$ in the embodiment) is stored in the storage unit after calculated in advance.

After the processing in the step S16 is completed, the ECU 20 obtains an in-cylinder pressure $P(\theta_2)$ at the time when the crank angle becomes $\theta_2$ degrees based on the signal from the in-cylinder pressure sensor 15 for each combustion chamber 3, after each spark plug 7 is ignited and also when a second timing (a timing when the crank angle becomes $\theta_2$ degrees) set before each exhaust valve Ve opens comes (step S18). Besides, the ECU 20 calculates a control parameter $P(\theta_2) \cdot V^\kappa(\theta_2)$ for each combustion chamber 3, which is a product of the obtained in-cylinder pressure $P(\theta_2)$ and a value obtained by exponentiating an in-cylinder volume $V(\theta_2)$ at a point when the in-cylinder pressure $P(\theta_2)$ is detected, in other words, when the crank angle becomes $\theta_2$ degrees by a specific heat ratio $\kappa$ ($\kappa$=1.32 in the embodiment), and stores the control parameter in a predetermined storage area in the RAM (step S20). It is preferable that the second timing is set as a point when combustion of the mixture in the combustion chamber 3 is nearly completed. The second timing is, for instance, defined as a timing ($\theta_2$=90°, in other words, 90° before a top dead center) when the crank angle indicated in the signal from the crank angle sensor 14 becomes 90°, in the embodiment. In addition, a value of $V^\kappa(\theta_2)$ (a value of $V^\kappa(90°)$ in the embodiment) is stored in the storage unit after calculated in advance.

When the control parameters $P(\theta_1) \cdot V^\kappa(\theta_1)$ and $P(\theta_2) \cdot V^\kappa(\theta_2)$ are obtained as stated above, the ECU 20 calculates a difference component of the control parameters $PV^\kappa$ between the first timing and the second timing for each combustion chamber 3 as the following:

$$\Delta PV^\kappa = P(\theta_2) \cdot V^\kappa(\theta_2) - P(\theta_1) \cdot V^\kappa(\theta_1)$$

and stores the difference component in the predetermined storage area in the RAM (step S22). The difference component $\Delta PV^\kappa$ shows heat production $\int dQ$ generated in each combustion chamber 3 for a period of time between the second timing and the first timing (between the two predetermined points) as stated above, i.e. an amount of heat generated in the combustion chamber 3 during the period of time from the first timing to the second timing. As described above, the difference component $\Delta PV^\kappa$ of the control parameters $PV^\kappa$ that appropriately reflects the heat production between the first timing and the second timing is simply and promptly calculated for each combustion chamber 3 through the processing from the step S14 to the step S22. Herewith, a load on calculation in the ECU 20 can be substantially reduced, as compared to a case where a misfire condition in each combustion chamber 3 is determined by integrating an in-cylinder pressure per unit of a minute crank angle.

At this point, the difference component $\Delta PV^\kappa$ showing heat production $\int dQ$ in any of the combustion chambers 3 between the second timing and the first timing (between the two predetermined points) changes in accordance with the level of a misfire in the combustion chamber 3. For instance, the difference component $\Delta PV^\kappa$ becomes below a predetermined value in a case where the combustion chamber 3 is in a half-misfire condition. Moreover, the difference component $\Delta PV^\kappa$ becomes below a predetermined value (zero, theoretically) in a case where the combustion chamber 3 is in a complete-misfire condition. Therefore, when the difference component $\Delta PV^\kappa$ is obtained in the step S22, the ECU 20 determines whether or not the difference component $\Delta PV^\kappa$ is below a first threshold value a defined in advance, for each combustion chamber 3 (step S24). When it is determined that in step S24, the difference component $\Delta PV^\kappa$ in all of the combustion chambers 3 is not below the first threshold value a, the ECU 20 assumes that a misfire does not occur in any of the combustion chambers 3, and the process returns to the step S10 and a series of the processing is repeated subsequently.

On the other hand, when it is determined in step S24 that the difference component $\Delta PV^\kappa$ in at least any of the combustion chambers 3 is below the first threshold value a, the ECU 20 assumes that the inside of the combustion chamber is in a half-misfire condition and increments a counter (not shown) corresponding to the combustion chamber by one (step S26). Besides, the ECU 20 determines whether or not a counter value in the counter is beyond a threshold value defined in advance (step S28). When it is determined in step S28 that the counter value in the counter is not beyond a threshold value defined in advance, the ECU 20 corrects, by using a certain map or the like, at least one of an opening of the throttle valve 10, a quantity of fuel injection from the injector 12, an opened/closed timing for an intake valve Vi and/or an exhaust valve Ve, or also an exhaust gas recirculating rate for an internal combustion engine equipped with an exhaust gas recirculating system, in accordance with the difference component $\Delta PV^\kappa$ obtained in the step S22 (step S30).

In other words, even if the difference component $\Delta PV^\kappa$ of the control parameters $PV^\kappa$ between the first timing and second timing is below the first threshold value a in the internal combustion engine 1, when the frequency of the event that the difference component $\Delta PV^\kappa$ is below the first threshold value a is low, the misfire that has occurred in the combustion chamber 3 is assumed as temporal. In addition, in such a case, the opening of the throttle valve, the quantity of fuel injection, the opened/closed timing for the valve and the like are corrected as needed (step S30). Herewith, occurrence of a subsequent misfire in the combustion chamber 3 is to be restrained.

Moreover, when it is determined in the step S28 that a count value in the counter is beyond a predetermined threshold value, i.e. the frequency of the event that the misfire in the combustion chamber 3 has occurred is beyond a predetermined threshold value, the ECU 20 resets the counter (step S32) and also determines whether or not the difference component $\Delta PV^\kappa$ obtained in the step S22 is below a second threshold value $\beta$ ($\beta$<a, in this regard) (step S34). Further, when it is determined in the step S34 that the difference component $\Delta PV^\kappa$ is below the second threshold $\beta$, the ECU 20 assumes that the inside of the combustion chamber 3 is in a complete-misfire condition due to an ignition failure of the spark plug 7 or the like, and shows a predetermined warning display (step S36).

When it is determined in step S34 that the difference component $\Delta PV^\kappa$ is not below the second threshold value $\beta$, the ECU 20 corrects, by using a certain map or the like, at least one of an opening of the throttle valve 10, a quantity of fuel injection from the injector 12, an opened/closed timing for an intake valve Vi and/or an exhaust valve Ve, or also an exhaust gas recirculating rate for an internal combustion engine equipped with an exhaust gas recirculating system, in accordance with the difference component $\Delta PV^\kappa$ obtained in the step S22 (step S30). That is, even if the frequency of occurrence of the misfire is beyond the above threshold value, when the difference component $\Delta PV^\kappa$ is not below the second threshold value $\beta$, the opening of the throttle valve, the quantity of fuel injection, the opened/closed timing for the valve and the like are corrected as needed (step S30). Herewith, occurrence of a subsequent misfire in the combustion chamber 3 is to be restrained. In addition, after the processing of the step S30 or the step S36, the ECU 20 returns to the step S10 and repeats a series of subsequent processing.

In this way, in an internal combustion engine 1, a misfire condition in the combustion chamber 3 is accurately determined at a low load based on a control parameter calculated based upon an in-cylinder pressure $P(\theta)$ detected by an in-cylinder pressure sensor 15 and an in-cylinder volume $V(\theta)$ at the time of detecting the in-cylinder pressure $P(\theta)$, i.e. a control parameter ($PV^\kappa$) that is a product of an in-cylinder pressure $P(\theta)$ detected by the in-cylinder pressure sensor 15 and a value obtained by exponentiating an in-cylinder volume $V(\theta)$ at the time of detecting the in-cylinder pressure $P(\theta)$ by a predetermined index number $\kappa$. In addition, in the internal combustion engine 1, when it is determined that the inside of the combustion chamber 3 is in a misfire condition (half-misfire condition), at least any of an opening of the throttle valve, a quantity of fuel injection, a valve opened/closed timing, an exhaust gas recirculating rate and the like is corrected for elimination of the misfire. Herewith, according to the internal-combustion engine 1, a desired power output thereof can be constantly produced while properly maintaining a rotational speed.

In addition, it should be noted that although the internal combustion engine 1 is described as a gasoline engine, it is apparent that the present invention is not limited to the gasoline engine but also may be applied to a diesel engine. Especially, the present invention is effective for determining a misfire in a rich mixture when a diesel engine operates in the rich mixture, or for determining a misfire when a so-called rich limit operation is performed in various types of internal combustion engines.

INDUSTRIAL APPLICABILITY

The present invention is useful for realizing a practical control device for an internal combustion engine and a method for determining a misfire in an internal combustion engine, which are capable of accurately determining a misfire condition in a cylinder at a low load.

The invention claimed is:

1. A control device for an internal combustion engine that generates power by burning an air-fuel mixture in a cylinder, comprising:
   in-cylinder pressure detecting means;
   calculating means that calculates a control parameter based on an in-cylinder pressure detected by the in-cylinder pressure detecting means and an in-cylinder volume at the time of detecting the in-cylinder pressure; and
   misfire determining means that determines a misfire condition in the cylinder based upon the control parameter calculated by the calculating means, wherein:
   the control parameter is a product of the in-cylinder pressure detected by the in-cylinder pressure detecting means and a value obtained by exponentiating the in-cylinder volume at the time of detecting the in-cylinder pressure by a predetermined index number;
   the calculating means calculates the control parameters in two predetermined points; and
   the misfire determining means determines that an inside of the cylinder is in a misfire condition by comparing a difference component in the control parameters between the two predetermined points with a predetermined threshold value.

2. The control device for the internal combustion engine according to claim 1, wherein:
   the misfire determining means determines that the inside of the cylinder is in a half-misfire condition when the difference component in the control parameters between the two predetermined points is below a first threshold value.

3. The control device for the internal combustion engine according to claim 2, wherein:
   when the misfire determining means determines that the inside of the cylinder is in the half-misfire condition, at least one of a throttle opening, a fuel injection quantity, an opened/closed timing of an intake valve or an exhaust valve, and an exhaust gas recirculating rate is corrected in such a way as to restrain a subsequent misfire.

4. The control device for the internal combustion engine according to claim 3, wherein:
   the misfire determining means that the inside of the cylinder is in a complete-misfire condition in a case where after the correction is made for a predetermined time, the difference component in the control parameters between the two predetermined points is below the first threshold value and also below a second threshold value, which is smaller than the first threshold value.

5. The control device for the internal combustion engine according to claim 1, wherein:
   one of the two predetermined points is set at a point after an intake valve opens and also before combustion starts, and the other is set at a point after the combustion starts and also before an exhaust valve opens.

6. A method for determining a misfire in an internal combustion engine that generates power by burning an air-fuel mixture in a cylinder comprising:
   (a) a step of detecting an in-cylinder pressure;
   (b) a step of calculating a control parameter based on the in-cylinder pressure detected in the step (a) and an in-cylinder volume at the time of detecting the in-cylinder pressure; and
   (c) a step of determining a misfire condition in the cylinder based on the control parameter calculated in the step (b), wherein:
   the control parameter to be calculated in the step (b) is a product of the in-cylinder pressure detected in the step (a) and a value obtained by exponentiating the in-cylinder volume at the time of detecting the in-cylinder pressure by a predetermined index number,
   in the step (b), the control parameters are calculated in two predetermined points; and
   in the step (c), it is determined that an inside of the cylinder is in a misfire condition by comparing a difference component in the control parameters between the two predetermined points with a predetermined threshold value.

7. The method for determining the misfire in the internal combustion engine according to claim 6, wherein:
   in the step (c), it is determined that the inside of the cylinder is in a half-misfire condition when the difference component in the control parameters between the two predetermined points is below a first threshold value.

8. The method for determining the misfire for the internal combustion engine according to claim 7, further comprising:
   (d) a step of correcting at least one of a throttle opening, a fuel injection quantity, an opened/closed timing of an intake valve or an exhaust valve, and an exhaust gas recirculating rate in such a way as to restrain a subsequent misfire when it is determined in the step (c) that the inside of the cylinder is in the half-misfire condition.

9. The method for determining the misfire for the internal combustion engine according to claim 8, further comprising:
   (e) a step of determining that the inside of the cylinder is in a complete-misfire condition in a case where after the correction in the step (d) is made for a predetermined time, the difference component in the control parameters between the two predetermined points is below the first threshold value and also below a second threshold value, which is smaller than the first threshold value.

10. The method for determining the misfire for the internal combustion engine according to claim 6, wherein:
    one of the two predetermined points is set at a point after an intake valve opens and also before combustion starts, and the other is set at a point after the combustion starts and also before an exhaust valve opens.

* * * * *